Feb. 11, 1930.  L. D. SUTFIN  1,746,747
AEROPLANE
Filed May 24, 1928  2 Sheets-Sheet 1

Inventor
L. D. Sutfin
By W. S. McDowell
Attorney

Feb. 11, 1930.    L. D. SUTFIN    1,746,747
AEROPLANE
Filed May 24, 1928    2 Sheets-Sheet 2

Inventor
L.D. Sutfin
By W. S. McDowell
Attorney

Patented Feb. 11, 1930

1,746,747

UNITED STATES PATENT OFFICE

L. D. SUTFIN, OF COLUMBUS, OHIO

AEROPLANE

Application filed May 24, 1928. Serial No. 280,292.

This invention relates to improvements in aeroplanes and has for one of its outstanding objects to provide an aeroplane wherein the body or fuselage thereof is provided at its opposite ends with motor driven propellers, which are adapted for the purpose of increasing the speed and power of the aeroplane and to admit of greater flexibility in the operation of the aeroplane while the latter is in flight.

Another object of the invention resides in the provision of an aeroplane consisting of a plurality of adjustable supporting surfaces or wings, wherein said wings are approximately of the same proportions and are situated in longitudinally spaced relation with respect to each other on the body or fuselage of the machine, the arrangement being such that one of said wings may be situated at the front of the fuselage and the other at the rear thereof, this unusual wing arrangement in combination with the double propeller drive, provides an aircraft of exceptionally great speed and yet one which is well balanced and safe and easy to operate and control.

Further objects reside in the provision of novel means for controlling the flexing of the wings and their operating positions and likewise the other flight controlling appliances of the machine.

With these and other objects in view which will appear as the description proceeds, the invention consists in the novel features of construction, combinations of elements and arrangements of parts hereinafter to be fully described and pointed out in the appended claims.

Figure 1:
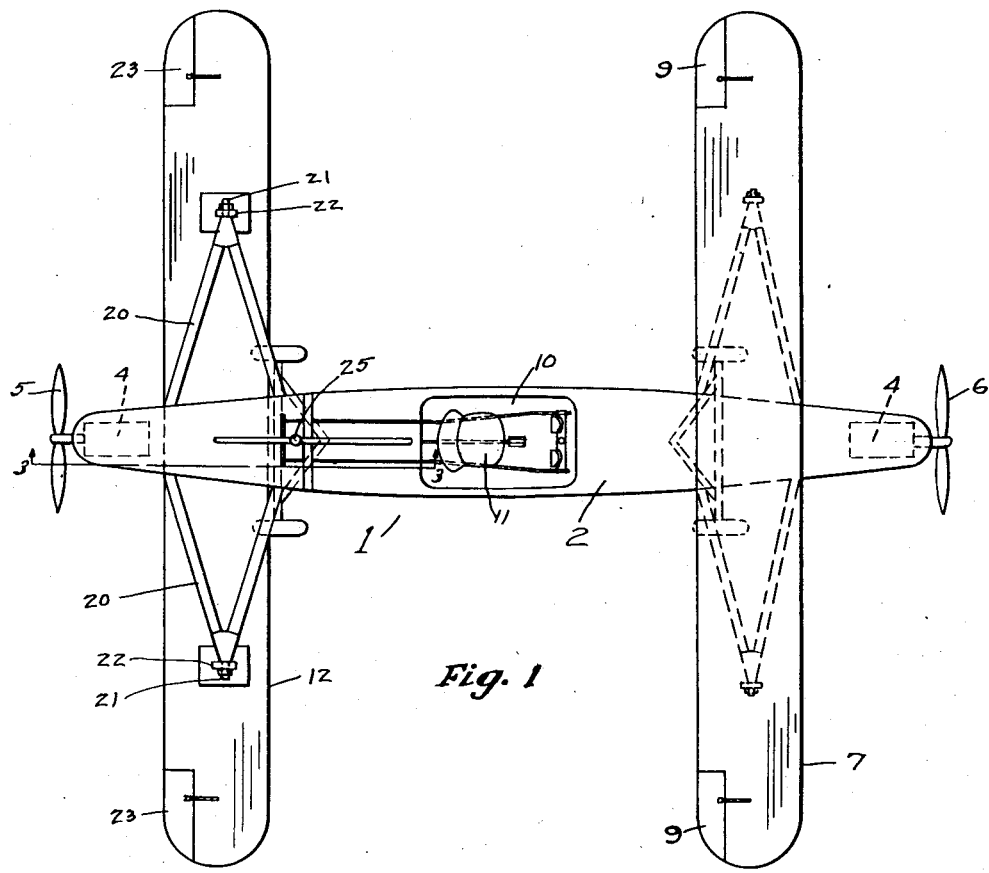
Figure 2:
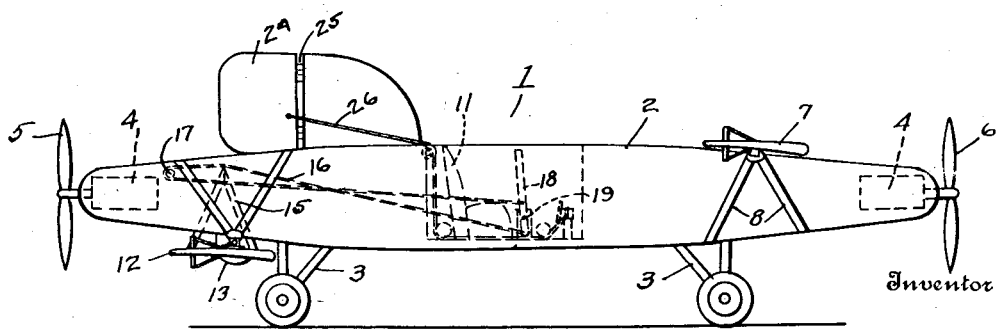
Figure 3:
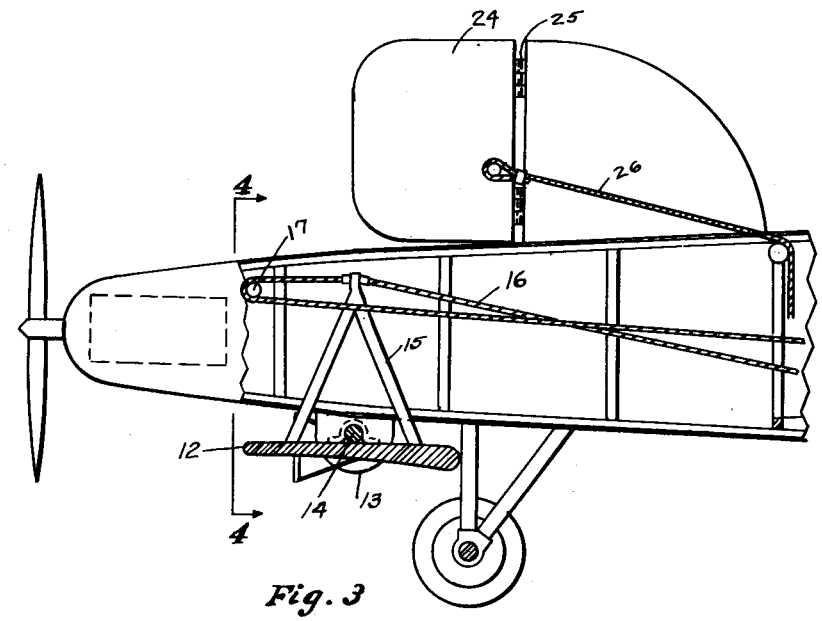
Figures 4, 5:
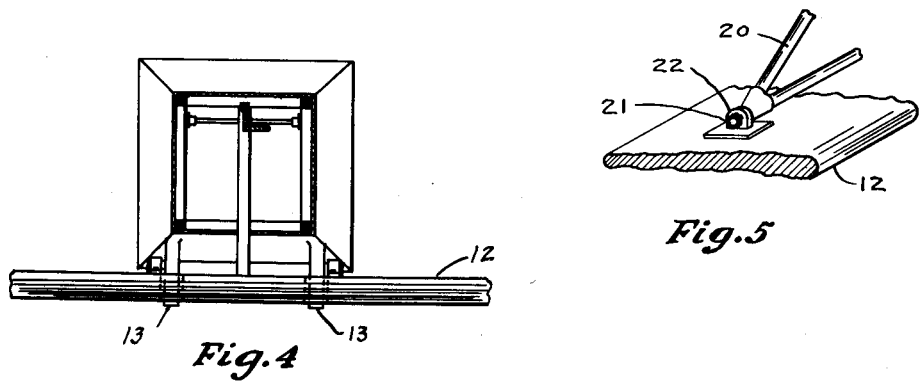

In the accompanying drawings:

Figure 1 is a plan view of an aeroplane formed in accordance with the present invention, Figure 2 is a side elevation thereof, Figure 3 is a vertical longitudinal sectional view taken through the rear portion of the plane, Figure 4 is a transverse sectional view on the line 4—4 of Figure 3, Figure 5 is a detail view of one of the outrider pivotal connections between the outrider frame and the adjustable wing.

Referring more particularly to the drawings, the numeral 1 designates the improved aeroplane comprising the present invention in its entirety. Generally, the aeroplane comprises a substantially cigar shaped fuselage or body 2, which is supported at both ends, when the machine is stationary, by the provision of depending wheeled frames 3. In this instance, the opposite ends of the body 2 are provided with suitable motors 4, which are utilized to drive front and rear propellers 5 and 6 respectively. By this construction power is applied to the aeroplane from both the front and rear ends of the same.

At the front of the fuselage and providing the upper surface thereof is a transversely extending wing or plane 7 which is of stationary, non-adjustable construction. The wing or plane is further braced from its under side by means of angularly extending truss frames 8, which project from the body 2. The extreme outer ends of the wing or plane 7 are provided along their rear edges with adjustable sections 9, the latter may be under the control of the operator to regulate their effective angular positions.

At approximately the center the fuselage or body 2 is provided with an aviator compartment 10, which is formed to include a seat 11, and other equipment and controls utilized in aerial navigation.

To the rear of the compartment 10 and carried by the rear of the body 2 is a second wing or plane 12. This wing or plane is of substantially the same area as the forward wing 7, but instead of being stationary or rigidly mounted on the fuselage 2, the rear wing 12, in contrast to the front wing, is adjustably mounted. This may be accomplished, as shown in Figure 3, by providing the under and rear part of the fuselage 2 with depending ears 13, which are received within slots formed in the rear wing 12. The wing 12 carries a shaft 14, which is receivable within aligned openings provided in the ears 13. This construction permits of the adjustment of the wing 12 horizontally upon its longitudinal axis, so that the angle of the rear wing with reference to the horizontal may be varied.

A simple method of accomplishing this is to provide the rear wing with an upstanding triangular frame 15, to which is connected a cable 16. This cable passes over a fixed guide or pulley 17 and has its opposite ends attached to an operating lever 18 which is pivotally mounted as at 19 within the aviator compartment 10, the opposite ends of the cable 16 being disposed on opposite sides of the lever pivotal point 19. By rocking the lever 18 it will be seen that the angle of operation of the rear wing may be readily and conveniently controlled.

To brace and reinforce the rear wing, the present invention includes a plurality of laterally extending outrider frames 20, which project angularly and downwardly from the upper and rear part of the fuselage 2. As shown in Figure 5 the extreme outer ends of these frames 20 terminate in short longitudinally extending studs 21, which are receivable within upstanding brackets 22 carried by the rear wing 12. The studs 21 are situated in longitudinal alignment with the shaft 14 so as to provide for the free turning movement of the rear wing and yet to effect its reinforced support in connection with the body or fuselage of the machine. The rear wing is also provided with outer flexing sections 23, which correspond to sections 9 of the forward wing. These sections are under control of the aviator to admit of more regulated movement on the part of the machine when effecting turns, banks or when effecting changes in altitude.

Arranged above the rear wing and carried by the body 2 is a rudder 24, adapted for movement about a vertical axis 25. The rudder is connected with cables 26 which extend to the aviator's control position.

In view of the foregoing it will be seen that the present invention provides a well balanced aeroplane of the multi-motored type. It will be observed that the motors are arranged in longitudinal alignment, whereby in the event that one of said motors should become disabled, the remaining motor will be in effective position to supply power to the machine. The construction permits of the use of but one motor in the event of injury to the other motor to sustain flight of the aeroplane, at least for a limited period of time or at reduced speed. With both motors, however, in use high speeds are obtainable and the balance of the machine preserved. It should be noted that the forward wing is situated so as to occupy a higher horizontal plane than the rear wing. By thus relatively displacing the two wings the effective operation of such wings is enhanced for the reason that the wind pressure exerted on one wing does not detract from the wind pressure exerted on the other wing.

What is claimed is:

1. In an aeroplane, a body, of substantially uniform construction at both ends, a wing carried by the forward end of said body and extending transversely and horizontally thereof across its upper surface, said wing being of a non-adjustable character, a second wing situated at the rear portion of said body and extending transversely and horizontally thereof across its under surface, said rear wing being spaced vertically to occupy a different horizontal position than said forward wing, means for adjusting the rear wing relative to said body about a substantially horizontally extending axis, a motor driven propeller carried by the front end of said body and a second motor driven propeller carried by the rear end of said body, said propellers being situated substantially in longitudinal alignment.

2. In an aeroplane, a body of substantially uniform construction at both ends, a wing carried by the forward end of said body and projecting laterally therefrom in a plane substantially even with the upper surface thereof, said wing being of a non-adjustable character, a second wing situated at the rear portion of said body and extending laterally therefrom in a plane substantially even with its under surface, said rear wing being spaced vertically to occupy a different horizontal position than said forward wing, means operable from the operator's seat for adjusting the rear wing relative to said body about a substantially horizontally extending axis, a motor driven propeller carried by the front end of said body and a second motor driven propeller carried by the rear end of said body, said propellers being situated substantially in longitudinal alignment.

In testimony whereof I affix my signature.

L. D. SUTFIN.